Dec. 9, 1930.  F. T. FARMER  1,784,342
LAWN MOWER
Filed May 5, 1925  2 Sheets-Sheet 1
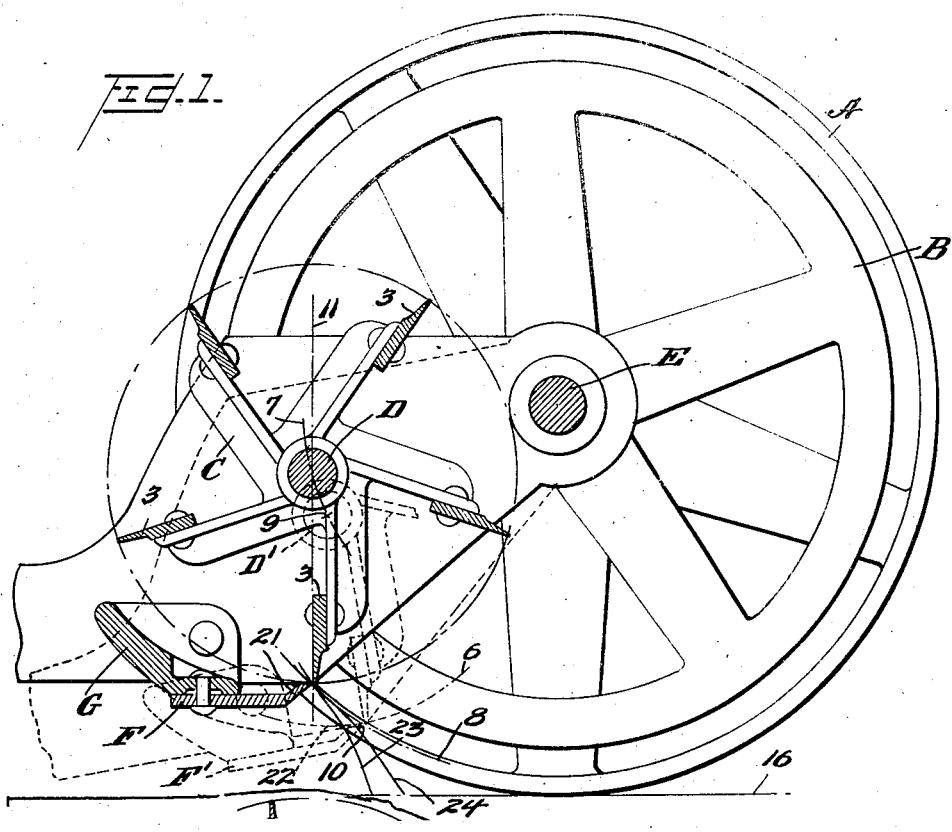
Inventor
Frank T. Farmer
By John Boyle
Attorney Dec. 9, 1930. F. T. FARMER 1,784,342
LAWN MOWER
Filed May 5, 1925 2 Sheets-Sheet 2
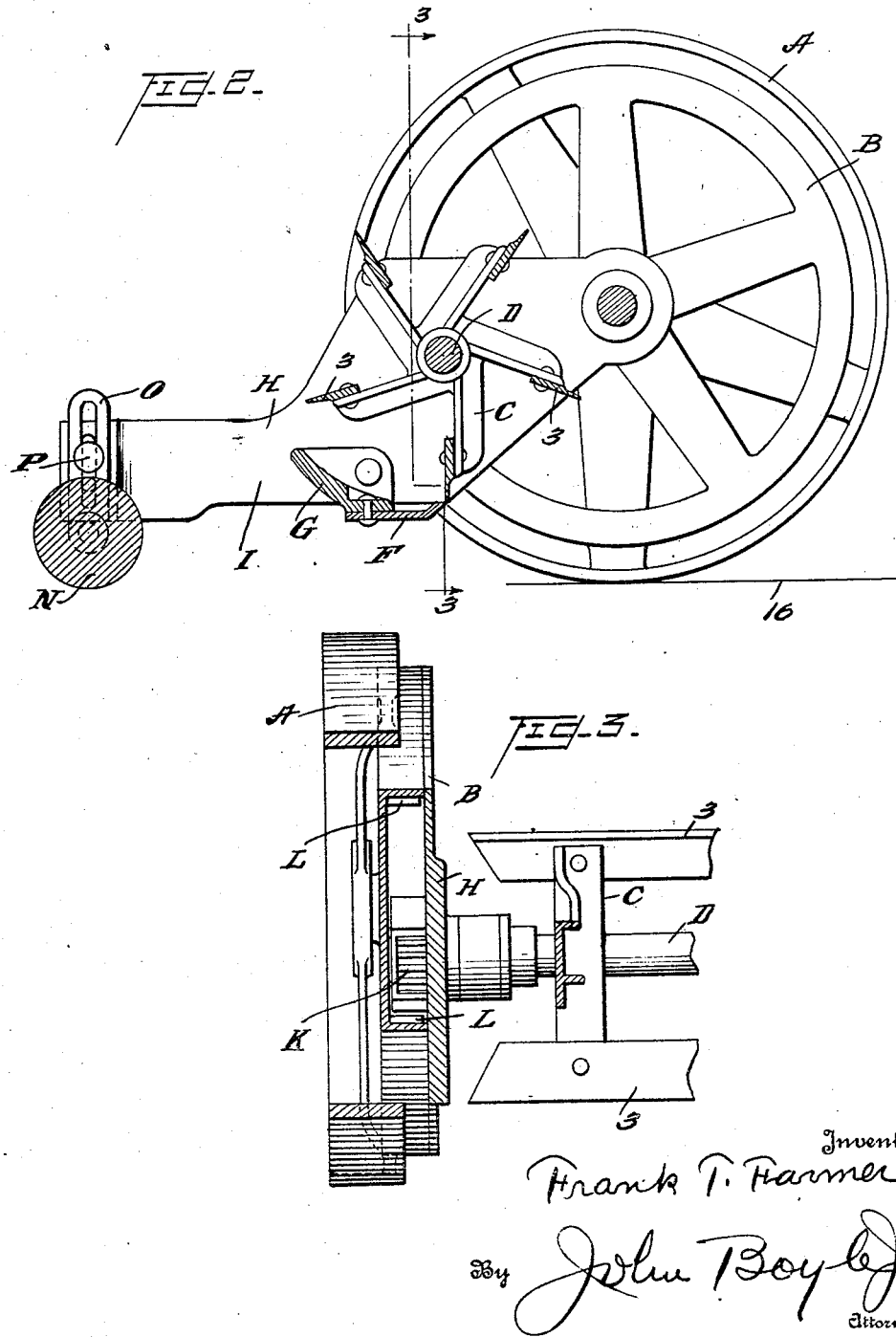

Patented Dec. 9, 1930

1,784,342

UNITED STATES PATENT OFFICE

FRANK T. FARMER, OF DETROIT, MICHIGAN, ASSIGNOR OF ONE-HALF TO ROBERT E. FARMER, OF NEW YORK, N. Y.

LAWN MOWER

Application filed May 5, 1925. Serial No. 28,144.

My invention relates to lawn mowers and particularly to a specific relation of the stationary or cutter bar blade to the center or axis of the reel or revolving knives.

Among its objects are:

(1) To provide a means whereby every blade of grass that is carried to the cutter bar blade by the revolving knives will be cut off.

(2) To provide a means whereby the blades of grass while being carried to the cutter bar blade by the revolving knives will not be pushed below the level of the cutting edge of the cutter bar blade.

(3) To provide a means whereby there is no limit to the number of revolving blades that can be used so long as there is a little space left between them to seize the grass and pull it against the cutter bar blade or stationary knife.

(4) To provide a means whereby the speed of the revolving knives is practically unlimited and they will seize, carry to the cutter bar and cut clean all the grass that they come in contact with.

(5) To provide a means whereby very short grass can be cut smooth and the scallops seen on a fresh cut lawn entirely eliminated.

More specifically, my improvement consists in locating the cutting edge of the cutter bar blade or stationary knife, when the revolving knives are adjusted in height to cut the grass at a maximum length, so that the said cutting edge of the cutter bar blade will be in cutting contact with the revolving knives or reel at a point where a vertical line drawn from the cutting point of contact will pass thru the center or axis of the reel bearing, no point of the circle described by the cutting edges of the reel knives in their revolution, dropping below the cutting edge of the cutter bar blade. Then when the reel or revolving knives, or in other words, the mower is adjusted to cut shorter grass, the cutting edge of the cutter bar blade is advanced in front of the vertical line drawn through the axis of the reel bearing, the amount of this advancement of the cutter bar blade being in proportion to the amount that the mower is adjusted lower to cut shorter grass, as hereinafter described.

In the drawing, letters are used to designate the various parts and numerals to designate special features of such parts.

Fig. 1 is a vertical section of a lawn mower, showing the relation of parts as embodied in my improvement; and Fig. 2 is a vertical section of a lawn mower showing a means for adjusting the position of the cutting elements; and Fig. 3 is a section on the line 3—3 of Fig. 2.

A are the drive wheels. B are the end frames which have rearwardly projecting tail pieces H integral therewith. A roller N supports the end of the tail piece H and is adjustable vertically with respect thereto through the medium of the slotted arm O that engages the fastening pin P, all of which is conventional construction and forms no part of my invention and serves as a convenient means for regulating the position of the cutting elements. D is a reel shaft revolubly mounted in the end frames B and carrying the spider C on which the reel blades 3 are mounted. The cutter bar G is carried by the end frames and the cutting blade F is mounted thereon. The reel shaft D is rotated by means of a pinion K engaging with the internal gear L on the drive wheels.

Referring to the drawings, the wheel A is resting on the ground line 16. The position of the reel and cutter bar is first located by determining approximately the maximum length at which the grass is desired to be cut, setting the reel center at a point so that the lowest point of a circle described by the reel blades as they revolve, comes to the highest point the grass is desired to be cut. A vertical line is drawn through the center of the reel as at 11 and the cutting edge of the cutting bar blade F is set so as to make a cutting contact with the reel blades at the vertical line 11. When the mower is adjusted up or down to cut high or low, the frame B which carries the reel and cutter bar rotates on the tie rod E with the center of the tie rod as the axis of the wheels. Thus, when the mower is adjusted to cut low the reel center of the shaft D travels on the arc 7 to a point as 9 of D'. The cutter bar blade cutting edge travels on the arc 8 to a point designated at 10, the cutter bar blade F taking the position of F'. As the radius of the arc 8 is longer than the radius of the arc 7, it necessarily follows that the cutting edge of the cutter bar travels farther on the arc 8 than the center of the shaft D does on the arc 7, consequently the cutting edge of the blade F' at 10 has advanced in front of the vertical line that passes through the center or axis of the shaft D'. Thus, the lowest point of the circle 6 described by the cutting edges of the reel blades is back of the cutting edge 10 of the cutter bar blade as at 22.

23 and 24 represent blades of grass and as they are pulled down to the edge of the cutting blade by the reel blade 3, they are cut off direct and not pushed below the cutting edge of the cutter bar blade; thus, every blade of grass the reel brings to the cutter bar blade is cut off and the grass farthest away as at 24 as soon as the end is clipped can spring back, be caught by the next reel blade, pulled down and cut again until the cutter bar blade F which is advancing has passed it. No grass can possibly be pushed under the cutter bar blade and not be cut.

The cutting edge of the cutter bar blade F' is some distance in advance of the vertical axial line through D' and thus is advanced up on the circle 6 that is described by the revolution of the reel blades and therefore meets the grass that is pulled down by the reel blades and better facilitates the cutting.

It is obvious from the foregoing that when it is desired to cut the grass very short and often in order to keep it smooth as on the putting greens of golf courses, any desired number of blades can be added to the reel and each blade will cut all the grass it gathers; or the number of blades can be increased and the speed of the reel also increased and still each blade will cut the grass clean because it carries every blade of grass to the cutting edge of the cutter bar blade and never goes below that point.

In order for me to place my cutter bar blade in the positions as described, I find it most practical to use what is called a lip blade; that is, the edge of the blade is turned up to form a lip 21 and the top of the lip is ground back, so as to present a clearance for the cutting edge to meet the reel blades. In practice, I make the lip much thinner than the main body of the blade and have it extending forward at a 40 degree angle so that as it wears down, a sharp edge is presented to the approaching reel blades, and the worn surface of the top of the lip is quite narrow and offers little frictional resistance to the revolving knives. I find that the 40 degree angle given the lip on my construction makes the mower cut fine, no matter how dull the revolving knives become, so long as they touch the cutter bar blade, for the cutter bar blade always presents a sharp edge for the grass to hit against, when gathered by the reel blades.

I claim:

1. A lawn mower provided with drive wheels, end frames supported by the drive wheels and by a ground roller, a rotary reel provided with knives and carried by the end frames, a cutter bar blade relative to which the said knives rotate and means for adjusting the position of the cutting elements so that their cutting edges are in vertical alignment with the axis of said rotary reel to cut the grass at the maximum length.

2. A lawn mower provided with drive wheels, end frames supported by the drive wheels and by a ground roller, a rotary reel provided with knives and carried by the end frames, a cutter bar blade relative to which the said knives rotate and means for adjusting the position of the cutting elements so that their cutting edges are in advance of a vertical line through the axis of said rotary reel to cut the grass shorter than the maximum length.

3. A lawn mower provided with drive wheels, end frames supported by the drive wheels and by a ground roller, a rotary reel provided with knives and carried by the end frames, a cutter bar blade relative to which the said knives rotate and means for adjusting the position of the cutting elements so that their cutting edges are in vertical alignment with the axis of said rotary reel to cut the grass at the maximum length and in advance of a vertical line through the axis of said rotary reel to cut shorter grass.

4. A lawn mower provided with drive wheels, end frames supported by the drive wheels and by a ground roller, a tie rod for connecting the end frames, a rotary reel provided with knives mounted on the end frames, a cutter bar blade relative to which the said knives rotate, means for rotating the end frames about the axis of the wheels for adjusting the position of the cutting elements so that their cutting edges are in vertical alignment with the axis of said rotary reel to cut the grass at the maximum length and in advance of a vertical line through the axis of said rotary reel to cut shorter grass.

5. A lawn mower provided with drive wheels, end frames supported by the drive wheels and by a ground roller, a rotary reel provided with knives and carried by the end frames, a cutter bar blade relative to which the said knives rotate and means for adjusting the position of the cutting elements so that their cutting edges are in advance of a vertical line through the axis of said rotary reel to cut the shortest grass and to the rear of the aforesaid position to cut longer grass.

6. A lawn mower provided with drive wheels, end frames supported by the drive wheels and by a ground roller, a tie rod for connecting the end frames, a rotary reel provided with knives mounted on the end frames, a cutter bar blade relative to which the said knives rotate, means for rotating the end frames about the axis of the wheels for adjusting the position of the cutting elements so that their cutting edges are in vertical alignment with the axis of said rotary reel to cut the grass at the maximum length and in advance of a vertical line through the axis of said rotary reel to cut shorter grass, the cutter bar blade having an upturned lip which is thinner than the body of the blade and at an angle of 40 degrees to the plane of the body of the blade.

In testimony whereof, I affix my signature.

FRANK T. FARMER.